C. PLETSCHER.
CONVEYER.
APPLICATION FILED APR. 12, 1915.
1,178,674.
Patented Apr. 11, 1916.
2 SHEETS—SHEET 1.
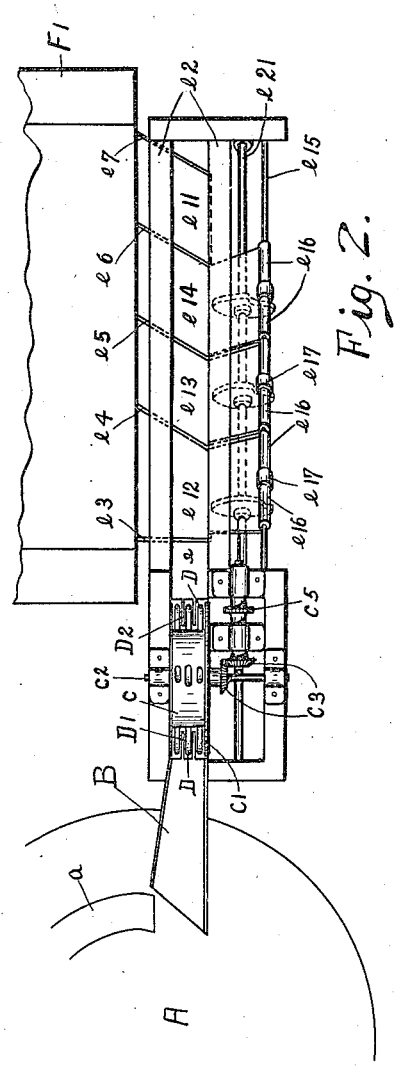

C. PLETSCHER.
CONVEYER.
APPLICATION FILED APR. 12, 1915.
1,178,674.
Patented Apr. 11, 1916.
2 SHEETS—SHEET 2.
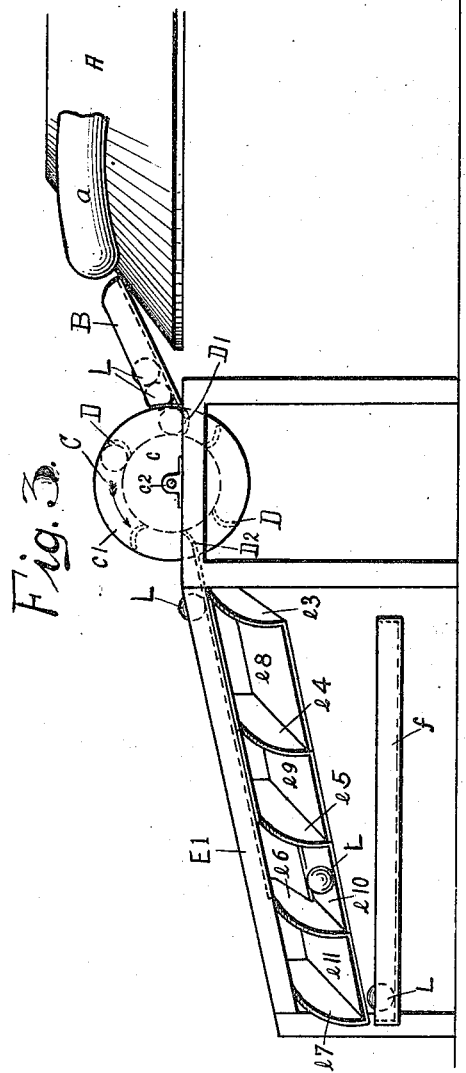
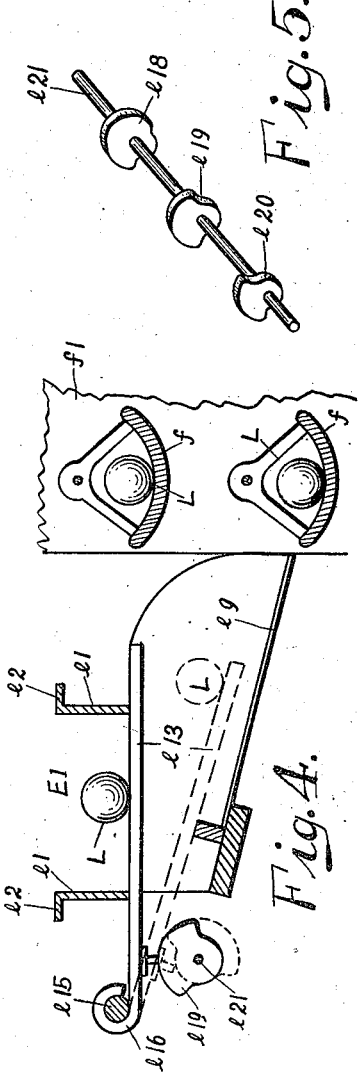
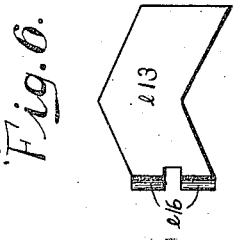
WITNESSES
Louis Charles Reese,
Archibald E. Hulgrave
INVENTOR
Carl Pletscher

UNITED STATES PATENT OFFICE.

CARL PLETSCHER, OF SAGINAW, MICHIGAN, ASSIGNOR TO WERNER & PFLEIDERER CO., OF SAGINAW, MICHIGAN, A FIRM.

CONVEYER.

1,178,674.  Specification of Letters Patent.  Patented Apr. 11, 1916.

Application filed April 12, 1915. Serial No. 20,652.

*To all whom it may concern:*

Be it known that I, CARL PLETSCHER, a citizen of the Republic of Switzerland, residing at Saginaw, in the county of Saginaw and State of Michigan, have invented new and useful Improvements in Conveyers, of which the following is a specification.

My invention relates to improvements in conveyers for transferring in predetermined regular numbers and intervals, articles from a machine in which they have been treated singly—one after the other, to a second machine in which they are further to be treated in rows on trays or the like, the single articles being delivered at their proper place in the latter machine.

The objects of my invention are to perform this operation automatically and more efficiently and economically than was possible hitherto.

In order to obtain the objects of my invention, I employ a specially constructed distributing channel or run arranging the articles on the boards or trays as required.

Figure 1 is a longitudinal elevation, Fig. 2 a top view and Fig. 3 a side view of a distributing run for four pieces of dough to be placed in a row on trays passing through the proofer. Fig. 4 shows a side view of the second section of the distributing run with the folding flap raised to form the bottom of the run for the dough pieces to travel onto the third and fourth section (counting the section nearest the reel as first) and with this flap lowered (in dotted lines) for the loaf of dough to drop into the chute of the second section. Fig. 5 is a side view of the shaft and the special cams working the folding flaps of the distributing run. Fig. 6 is a top view of the folding flap belonging to the second section of the distributing run.

A is a rounder forming pieces of dough into round balls in its molding channel $a$.

B is the chute leading the dough balls L from A to the assorting reel C adapted to deliver the balls to the distributing run E in regular intervals.

D are the four combs attached in regular interstices to the drum $c$, which together with the flanges $c_1$ forms the reel C.

$D_1$ is the comb forming the lower end piece of the inlet-run of the chute B, and $D_2$ is the comb forming the upper end of the distributing run $E_1$ adapted to arrange the dough pieces coming from the reel C in rows of four and depositing them on the shelves $f$ traveling through the proofer $F_1$.

$e$ is the solid part of the distributing run $E_1$, to which the comb $D_2$ is attached.

$e_1$ are the sides and $e_2$ the top edges of $E_1$. $e_3$, $e_4$, $e_5$, $e_6$, and $e_7$ indicate partitions of the run $E_1$ forming the four sections of the channel and their chutes $e_8$, $e_9$, $e_{10}$ and $e_{11}$ underneath for conducting the dough pieces to the tray $f$ of proofer $F_1$. The three upper sections are provided with the folding flaps $e_{12}$, $e_{13}$ and $e_{14}$ which are closed while a dough piece travels down the run into the last and lowest section and chute $l_1$, and open successively as the dough pieces arrive for the chutes $e_{10}$, $e_9$, and $e_8$. The folding flaps $e_{12}$, $e_{13}$ and $e_{14}$ turn on the shaft $e_{15}$ on the hinges $e_{16}$ and are kept in their right position on $e_{15}$ by the bosses or collars $e_{17}$; the flaps are worked by their special cams $e_{18}$, $e_{19}$ and $e_{20}$ fixed to the shaft $e_{21}$. The circumference of these cams are constructed and designed so as to raise and lower the folding flaps in the order as described above and as is especially shown in Fig. 5. The shaft $e_{21}$ which is necessarily inclined, is rotated by means of the universal joint $e_{22}$ and the shafting and gearing $c_4$.

In all the arrangements shown, the reel C rotates around its axle $c_2$ in the direction of the arrow and is driven by the driving gear of the proofer.

In Fig. 1 the sprocket wheel $f$ and chain $f_2$ connected to the driving gear of the proofer $F_1$ drive the gearing $c_4$ which drives by means of the sprocket wheels and chain $c_5$ the gearing $c_3$ turning the reel C, and also works the flaps of the distributing run E as explained above.

The *modus operandi* of the automatic conveyer is as follows: The dough pieces L leaving the molding channel $a$ of the rounder A collect in the chute B. The piece resting on the stationary comb $D_1$ is lifted therefrom by the comb D of the rotary reel C, a fresh piece of dough immediately taking the place on $D_1$ of the piece carried away by D. The piece carried away from $D_1$ by D travels first upward and then drops on its downward passage onto the comb $D_2$ at the outlet of reel C and thus into the distributing channel $E_1$, which leads it to its proper place on the tray in the proofer $F_1$. Assuming an empty tray were to be filled, it would stand stationary before the chutes of the distributing run E. The first dough piece to be placed on the tray would travel down from comb $D_2$ over the solid end piece $e$ and the raised flaps $e_{12}$, $e_{13}$ and $e_{14}$, to the chute $e_{11}$, from which it drops on the tray $f$ within the proofer $F_1$. The second piece of dough would run from $D_2$ over $e$ and the raised flaps $e_{12}$ and $e_{13}$ down the meanwhile lowered flap $e_{14}$ and the chute $e_{10}$ onto the tray $f$. The third dough piece would run from $D_2$ over $e$ and the raised flap $e_{12}$ down the meanwhile lowered flap $e_{13}$ and the chute $e_9$ onto the tray $f$. The fourth and last dough piece would drop from the end piece $e$ direct on the lowered flap $e_{12}$ and pass through the chute $e_8$ onto the tray $f$, which, now being completely filled, moves away and gives place to an empty tray. As soon as the last dough piece left the flap $e_{12}$, all the three flaps, $e_{12}$, $e_{13}$ and $e_{14}$ are raised again ready for the first dough piece for the fresh tray to pass thereon to the chute $e_{11}$ and the second tray $f$, and so on as before continuously.

It will be understood that the drawings give only an example of the general design of the automatic conveyer forming the object of my invention and that such deviations from the details shown, which would not be contrary to or form a departure from the spirit of the invention, may be resorted to and are included in my claims.

I claim:

1. In a conveyer of the character described, comprising an inclined channel divided into as many sections as articles delivered in a single file to the top part of the channel are to be placed in one row in a required interval of time, each section with exception of the lowest one being provided with a movable flap turning loosely on hinges around a rod having a similar inclination as the channel, these flaps, when raised, forming the bottom of the passage for the articles to travel on to the various sections, means for raising and lowering the flaps, and a rotary shaft to which these means are attached and which has a similar inclination as the channel, the arrangement being such that, when the shaft is rotated, the flaps are lowered one after the other from the lowest to the topmost one, and then quickly raised again, all within the required interval of time.

2. The combination with a conveyer delivering articles in single file, an inclined channel divided into as many sections as articles are to be placed in one row in a required interval of time, chutes arranged underneath each such section and adapted to lead the articles dropped thereinto to their proper places in the row to be made, flaps covering, when raised, each section with exception of the lowest one so as to form the bottom of the passage for the articles to travel on to the various sections, hinges attached to each of the flaps, a shaft around which these hinges turn loosely, and having a similar inclination as the channel, and a rotary shaft also similarly inclined and provided with means to lower one flap after the other successively from the lowest to the topmost one and then to raise them all quickly again in the required interval of time.

3. In combination with a conveyer delivering articles in single file, an inclined channel having upright side walls and a stationary top part and divided into a number of sections, chutes arranged one underneath each section, movable flaps for all the sections with exception of the lowest one, hinges attached to these flaps, a stationary rod around which the hinges of the flaps turn, and so arranged at the side of the channel, that, when the flaps are raised, they form the bottom of a passage the sides of which are the upright side walls of the channel, a rotary shaft arranged alongside the same, but underneath the flaps, and eccentrics fixed to this shaft—one eccentric for each flap—and so constructed in circumference and arranged that, when the shaft is turned, the flaps drop one after the other from the lowest to the topmost one, and then are all raised again.

4. In combination with a rotary reel provided in its annular channel with a number of comblike rows of projections, an inclined channel having upright side walls and a stationary top part, a comblike row of projections attached to the stationary top part of the inclined channel and meshing with the comblike rows of projections carried by the reel, chutes arranged one underneath each section of the inclined channel and adapted to lead the articles dropped into the section they belong to, to their proper places in the row of articles to be made, movable flaps one for each section with exception of the lowest one, hinges attached to these flaps, a stationary rod around which the hinges of the flaps turn, and so arranged alongside the inclined channel that, when the flaps are raised, they cover the section they belong to and form the bottom of a passage the sides of which are the upright side-walls of the inclined channel, a rotary shaft arranged also alongside the latter, but underneath the flaps, and eccentrics one for each flap—and fixed to the rotary shaft and so constructed in circumference and arranged, that, when the shaft is turned, the flaps drop one after the other from the lowest to the topmost one, all the flaps being raised again for the same play to begin again.

CARL PLETSCHER.

Witnesses:
 LOUIS CHARLES REESE,
 ARCHIBALD E. HULGRAVE.